United States Patent [19]

Franklin

[11] Patent Number: 5,510,946

[45] Date of Patent: Apr. 23, 1996

[54] CIRCUIT BREAKER PROTECTION AGAINST "ARC SHORT CIRCUIT" HAZARDS

[76] Inventor: Frederick F. Franklin, 3501 Tiffany Ridge, Blue Ash, Ohio 45241

[21] Appl. No.: 308,686

[22] Filed: Sep. 19, 1994

[51] Int. Cl.⁶ ........................................................ H02H 9/02
[52] U.S. Cl. ............................. 361/56; 361/42; 361/102; 361/105
[58] Field of Search ................................. 361/54–57, 93, 361/105, 110, 111, 42, 88, 102

[56] References Cited

U.S. PATENT DOCUMENTS

| | | | |
|---|---|---|---|
| 4,079,439 | 3/1978 | Coles et al. | 361/355 |
| 4,673,097 | 6/1987 | Schuldt | 220/3.5 |
| 4,700,259 | 10/1987 | Stokes | 361/103 |
| 4,858,054 | 8/1989 | Franklin | 361/57 |

*Primary Examiner*—A. D. Pellinen
*Assistant Examiner*—Michael J. Sherry
*Attorney, Agent, or Firm*—Kinney & Schenk

[57] ABSTRACT

An electrical service installation comprises a plurality of circuit breakers protecting against overcurrent hazards in branch load circuits. An acceleration, bypass circuit is provided for each circuit breaker. Current flow through each of the bypass circuits is controlled by a normally non-conductive SCR. Current flow to each branch circuit passes through a sensing resistor that is connected across the gate and cathode of the associated SCR. When the voltage drop across the sensing resistor reflects a current level indicative of an "arc short circuit", the SCR is triggered to a conductive state. Current then flows through the bypass circuit increasing current flow through the associated circuit breaker, to thereby provide a substantially increased current magnitude for magnetically tripping the circuit breaker. Circuit breakers are thus tripped to provide protection against the hazards of "arc short circuit" currents that do not have a magnitude sufficient to initiate magnetic tripping.

24 Claims, 6 Drawing Sheets

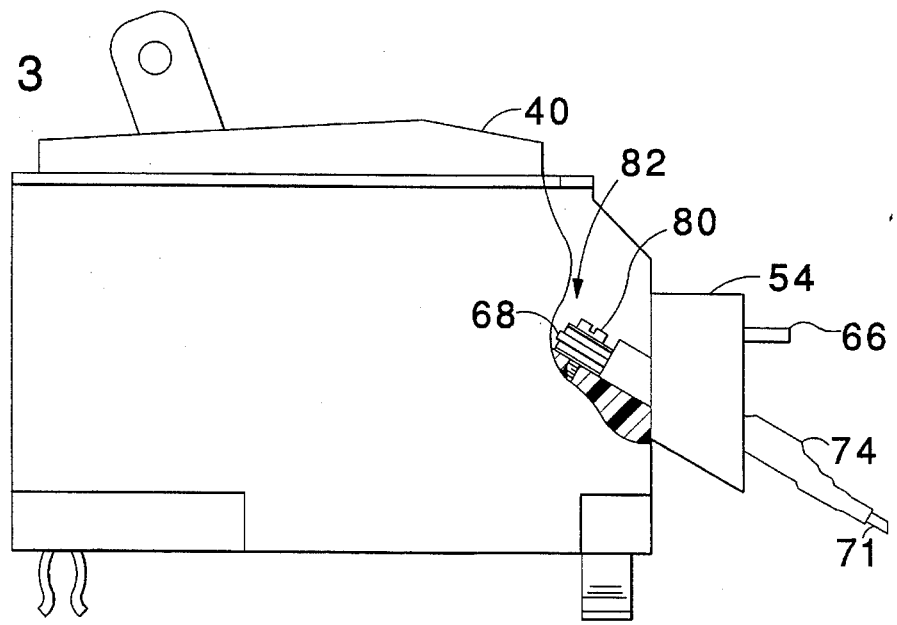
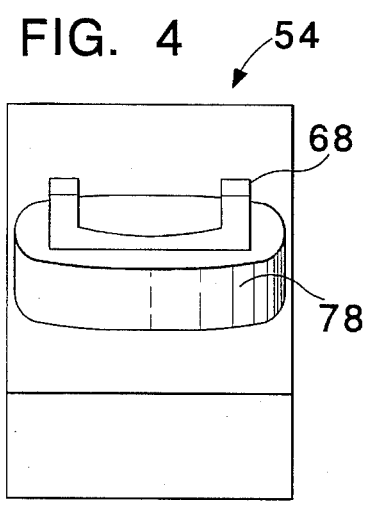
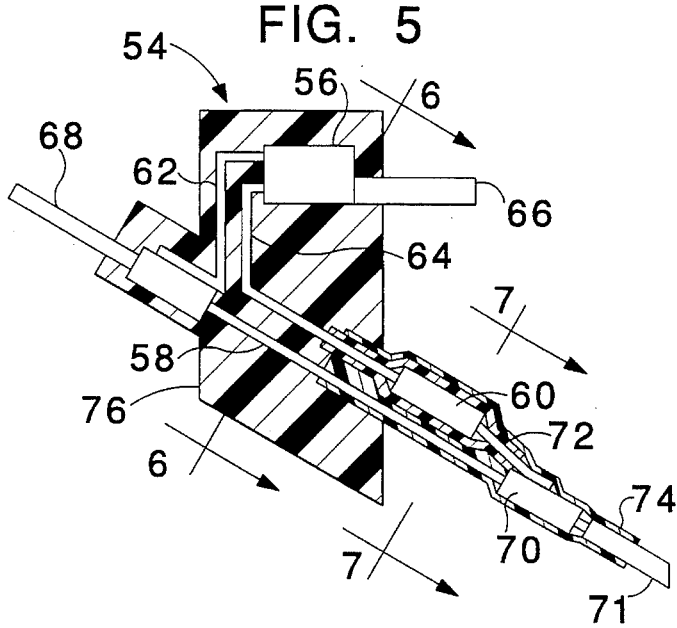
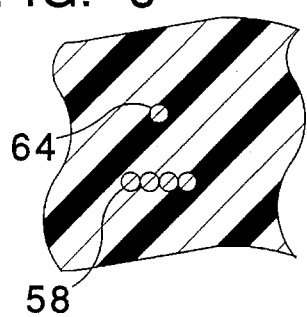

CIRCUIT BREAKER PROTECTION AGAINST "ARC SHORT CIRCUIT" HAZARDS

The present invention relates to circuit breakers and more particularly to improved means for accelerating circuit breaker actuation to thereby assure tripping of circuit breakers below a "let-through" energy level which is sufficient to ignite common combustible materials and to thereby minimize, if not eliminate, the likelihood of electrical fires in residences and other structures, particularly as might by caused by an "arc short circuit".

As a point of reference, the term "electrical fire" is a misnomer, in that electricity does not burn, nor does it directly support combustion. Instead electrical energy is the source of ignition for combustible material. The resulting fire is then referenced as an "electrical fire". The focus of the present invention is on minimizing "electrical fires" of the type that are ignited by "arc short circuits".

It has long been recognized that a "short circuit" generates sufficient heat energy to ignite combustible material, which in turn can become a self sustaining "electrical fire". Initially the term "short circuit" was associated with and recognized as denoting a direct contact between an energized conductor and a grounded conductor, or some other mechanism whereby resistance to current flow is so minimal that current flow increases to an extremely high value. The heat generating mechanism is, primarily, a function of the magnitude and duration of the current flow. As will be noted below, conventional circuit breakers are highly effective in deenergizing a circuit when a "dead short" occurs, to thereby prevent current flow, resulting from a "dead short circuit", from initiating an electrical fire.

It is to be recognized that a "dead short circuit" creates a low resistance current flow path that bypasses the load circuit which is intended to be energized by the conductor. Thus, in a generic sense, a "short circuit" is an unintended, current flow path that bypasses the intended load circuit.

It has only recently been recognized that there is another type of "short circuit" which is a significant causative factor of "electrical fires". Reference is being made to "arc short circuits", wherein the heat of an electrical arc provides the primary, heat energy for igniting combustible material.

It is well established that with even a minimal air gap, a 350 volt potential is required to establish an electric arc in air. This would lead to the conclusion that electrical arcs are not a causative factor in electrical fires in residential electrical circuits, and other installations, where the maximum potential is, normally, 240 volts. However, it is possible to create an arc by separating an energized conductor from a ground connection. This is exemplified by electrical arc welding. In any event, there can be momentary contact by an energized conductor with a grounded connector and then separation to a distance whereat an arc is temporarily established at potentials as low as 120 volts, this being what is usually found in residential electrical service installations. In an environment involving high vibrations, there can be repeated making and breaking of such contact and establishment and extinguishing of an arc. Under these conditions, the heat of the arcs, not the energy of the electric current, is the primary mechanism for ignition of combustible material.

Another, and now recognized as more frequent, illustration of an "arc short circuit" is the result of an anomaly in the insulation that separates two conductors, as in a cord connecting an appliance to an outlet receptacle, or in a nonmetallic sheathed branch circuit cable extending from an electrical service box to an outlet receptacle. Such conductors are physically separated by a distance of as much as ¼ inch or more by a dielectric material. In theory, there is no possibility of current flow therebetween. Nonetheless, it has been established that irregularities in the insulation, and also entrapped water vapor, enable microcurrent flow to be established and, over a period of time, for such microcurrent to carbonize the separating insulation. The carbonized electrical flow path, thus created, has a reduced electrical resistance. At some point, there will be flow of current along the carbonized path. Such flow is capable of establishing an arc between the conductors, even at the lower potentials of 120 volts and 240 volts employed in residential circuitry and most all other low power electrical circuits.

"Arc short circuits" between adjacent conductors in electrical cords or cables can be intermittent in nature in that the carbon defining the flow path tends to vaporize to the end that the arc will extinguish and then be reestablished. The mechanisms of arc formation, dynamics and characteristics are not fully understood, but the creation of "short circuits" arcs under the described circumstances has been verified by the observation of arcs and the existence of molts on the surfaces of the conductors.

It is further to be recognized that "short circuit" arcs can be very fleeting in nature. That is, the arcs tend to be established as short circuit current flow that reaches a peak value and then, as the potential cycles to the opposite polarity, the arc extinguishes. It is also to be recognized that an electric arc possesses an inherent electrical resistance that limits current flow.

Empirical data establishes that there is a fairly wide range of currents in "arc short circuits", and that the frequency/magnitude of "arc short circuit" currents follows a bell shaped curve. For 15 ampere circuits the threshold value is approximately 60 amperes, with less than 75 amperes occurring in something approximating only 5% of the occurrences of an "arc short circuit", and with there being about 150 amperes, or less, in 50% of the occasions of an "arc short circuit". The shape of the bell shaped curve is also a function of the rating of the circuit in which it occurs—the present invention is primarily concerned with 15 and 20 ampere circuits as found in residential electrical service installations. Empirical data indicates that more than 90% of all "arc short circuit" fires occur in these 15-20 amp circuits. Another factor affecting the shape of the bell shaped curve is the line resistance, as where the "arc short circuit" is created at the end of a small gauge cord employed in connecting an appliance.

It is to be recognized that simply because a "short circuit" arc is established, it is not a necessary result that a fire will be initiated. Whether or not ignition occurs is dependent on many factors not fully understood. However, the length of time that the "short circuit" arc exists does bear upon the likelihood of a fire being started in that the total energy available for ignition is a direct function of time.

Circuit breakers are a widely known mechanism for limiting current flow through an electric circuit and thereby providing protection against electrical fires, as well as protecting a load from the hazards of an overcurrent condition. Circuit breakers are preferred to fuses, that can perform the same function, because they are reusable.

Circuit breakers comprise a bimetallic strip that is heated proportionately to the magnitude of current flow. When the energy of current flow (involving a time factor) exceeds a given value, the strip flexes to open a set of contacts and terminate current flow, i.e., the circuit breaker is tripped. A circuit breaker also has a coiled electrical flow path that causes it to "trip" instantaneously, like a relay, when the magnetic field induced in the circuit breaker exceeds a threshold value.

Circuit breakers are conventionally rated as to their steady state current flow. Fifteen and twenty ampere circuit breakers are conventionally employed in so-called branch circuits and are of particularly interest herein.

Circuit breakers are widely accepted as a preferred means of load circuit protection because of their energy responsive characteristic. This is to point out that many electrical loads have a very low resistance when first energized. After energization, the load resistance very quickly increases and the current drawn by the load is reduced below the rated current of the circuit breaker for continuous, steady state operation. It is also possible for a motor (or other electrical load) to be temporarily overloaded in use and draw current in excess of the rated current for a circuit breaker, all without harm to the motor or otherwise creating any type of hazard. This start up current, which is in the nature of a temporary or normal overload, is referred to as "inrush" current. The energy responsive characteristic of a circuit breaker is of great significance in preventing nuisance tripping when overcurrent conditions do not represent a real or significant danger.

Another characteristic of circuit breakers, of significance to the present invention, is that they are also rated according to the multiple of rated current at which they will magnetically trip. This is say that a 5×, fifteen amp circuit breaker circuit breaker would magnetically trip at 75 amperes and a 10×fifteen amp circuit breaker would magnetically trip at 150 amperes. Commercially available circuit breakers in the United States vary widely in their magnetic trip levels ranging generally from 10× to 20× and more. Variations are found not only between various manufacturers, but also between various models of a given manufacturer, such variations in a given model of a given manufacturer can be as much as ±50%, and even more.

The foregoing further explains the background of what are now referenced as "arc short circuit" fires, being the same, in principle, as discussed in my earlier U.S. Pat. No. 4,858,054. In my earlier patent, the proposed solution was to instantaneously increase current flow through a circuit breaker upon detection of current flow that would indicate a short circuit had been created.

The objects of the present invention are, in general, the same as in the invention of my referenced patent, i.e., accelerating the actuation of a circuit breaker in order to interrupt current flow before there is sufficient energy in a short circuit to ignite combustible material and initiate an electrical fire.

More specifically, the object of the present invention is to more economically achieve the foregoing ends.

A further object of the present invention is to facilitate achieving such ends by retrofitting existing electrical service installations through the addition of acceleration units that will cause circuit breakers to trip prior to there being sufficient energy in an "arc short circuit" to ignite combustible material.

Yet another object of the present invention is to provide economical means for substantially reducing the possibility of "arc short circuits" being established at an energy level that would be sufficient to ignite combustible material.

In a broad sense, the ends of the invention are attained by the provision of acceleration means for increasing the flow of current through a circuit breaker to thus accelerate its magnetic tripping. The acceleration means are responsive to branch circuit flow that reaches the lower end of the range of "arc short circuit" currents. Bearing in mind that relatively low "arc short circuit" currents occur in only a small number of occurrences of "arc short circuits", it would be preferred to actuate the acceleration means when current flow reaches the threshold value for "arc short circuit" current, or at a level of current flow that would occur in at least about 90% of the occurrences of an "arc short circuit".

Another aspect of the invention is found in provision of means for increasing the current through a branch circuit, circuit breaker by way of a bypass circuit from the output of the circuit breaker to the neutral bus of an electrical installation. A normally open (non-conductive) electrical switch, preferably an SCR, controls current flow through the bypass circuit. The electrical switch is actuated to a conductive state in response to current flow exceeding the threshold value for "arc short circuit" current flow.

The costs of the acceleration means are minimized by limiting the current flow through the SCR, making possible the use of an inexpensive SCR. Further economies are found in employing a single, common resistor for limiting the current flow in any bypass circuit that is rendered conductive through triggering of the SCR therefor.

The SCR is triggered to a conductive state by the voltage drop across sensing resistor means that are in series with a branch circuit load cable. The sensing means are preferably formed of constantan, or other resistor material having an essentially zero temperature coefficient. Another feature of the invention is found in the provision of means for varying the resistance of the sensing resistor means so that the SCR can be triggered to a conductive state at higher current levels, to thereby minimize nuisance tripping, where there is an electrical load that has an unusually high, "inrush" current level.

A further feature of the invention is found in the provision of an integral unit comprising the SCR, the sensing resistor means and a current limiting resistor for the SCR gate. This unit, preferably, comprises a flame retardant, resinous block in which the identified components are potted. Projecting from this block are a connector which is adapted to be connected to the output of a branch circuit, circuit breaker, a binding screw for connection of a branch circuit cable conductor thereto, and an SCR lead adapted to connect the anode thereof to the common load resistor. The SCR cathode and one end of the sensing resistor means are connected to the connector that is to be connected to the branch circuit, circuit breaker. The current limiting resistor for the gate is connected to a downstream portion of the sensing resistor and the latter is connected to the binding screw.

The above and other related objects and features of the invention will be apparent from a reading of the following description of a preferred embodiment and the novelty thereof pointed out in the appended claims.

IN THE DRAWINGS:

FIG. 3 is an elevation of a conventional circuit breaker, with an accelerator unit mounted thereon;

FIG. 4 is an end view of the accelerator unit seen in FIG. 3;

FIG. 5 is an elevation of the accelerator unit seen in FIG. 3;

FIG. 6 is a section taken on line 6—6 in FIG. 5;

FIG. 7 is a section taken on line 7—7 in FIG. 5;

Figure 1:
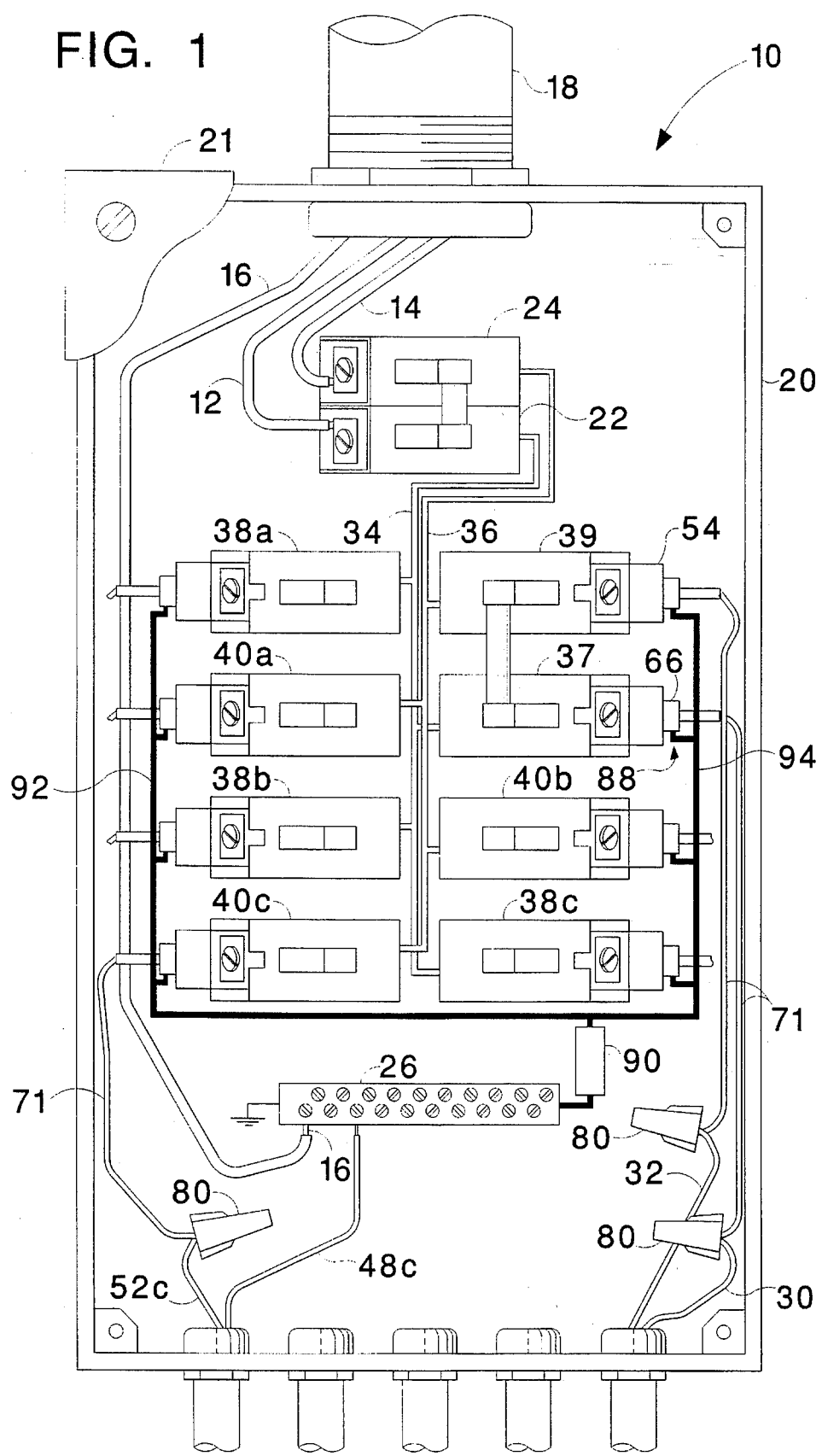
FIG. 1 is an elevation of a circuit breaker box, illustrating the installation of the accelerating means of the present invention, with certain components shown in simplified form.

FIG. 1 illustrates a typical, conventional circuit breaker box (indicated generally by reference character 10) of the type employed at the electrical service entrance to a residence. Outside service is provided by way of three conductors 12, 14 and 16, which are connected to a remote power source. These conductors are appropriately insulated and may be fed to the top end of the circuit breaker box 10 through a conduit 18. Typically the box comprises a sheet metal shell 20 having a back panel and rectangular side panels defining an area within which circuit breakers and the connections thereto are mounted. It is also a customary practice to provide a front panel cover 21 that shields the elements mounted in the shell 20 from direct contact. Limited access is provided for rescuing of the circuit breakers, but access to wiring connections requires removal of the front panel.

Figure 2:
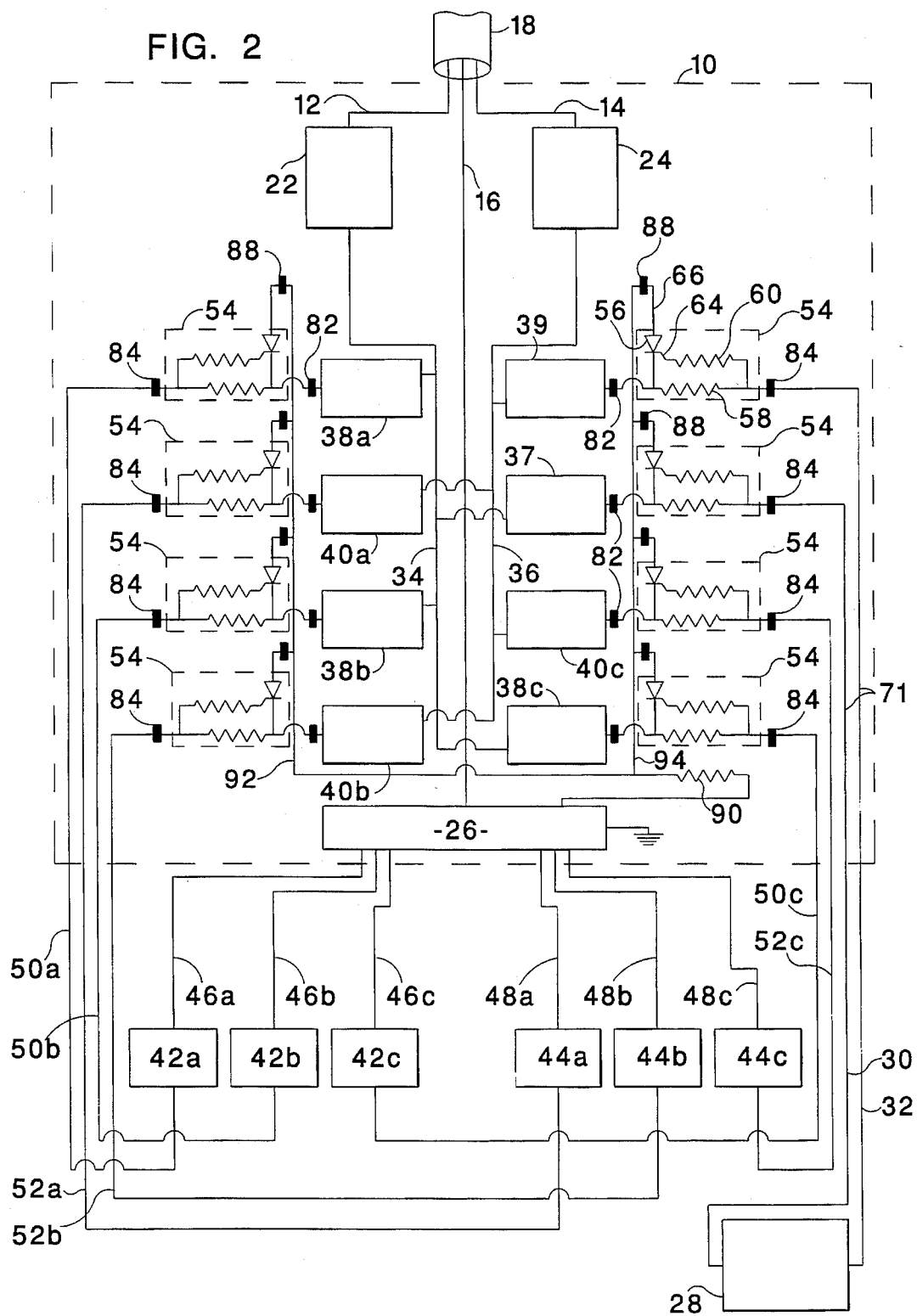
FIG. 2 is a diagram of a typical residential electrical circuit illustrating branch circuits protected by the circuit breaker accelerating means of the present invention.

The conductors 12, 14 are connected across an alternating current source having a potential of 240 volts. The third conductor, 16 is a neutral conductor. The potential of the conductors 12, 14 with respect to the neutral conductor 16 is 120 volts, with the potential of the conductors 12, 14 being 180° out of phase. The conductors 12, 14 are, respectively, connected to "main" circuit breakers 22, 24. The conductor 16 is connected to a neutral bus 26, which is, preferably, grounded. Reference is also made to FIG. 2, which illustrates the electrical connections in schematic fashion.

The output of the main circuit breakers 22, 24 is fed to 120 volt busses 34, 36, which provide connection taps that alternate, to one side and then to the other for connection of further circuit breakers thereto, as will now be further described.

An electrical load 28 (such as an electric clothes drier) that operates more effectively on the higher 240 volt potential maybe connected directly across the circuit breakers 22, 24 by way of conductors 30, 32. More specifically 240 volt, branch circuit breakers 37, 39 are placed in series, respectively with the main circuit breakers 22, 24. In residential service, most electrical loads are rated for operation at 120 volts in what are referred to as "branch" circuits. Thus, the output of each of the "main" circuit breakers 22, 24 is connected, respectively, to 120 volt busses 34, 36. The 120 volt, branch circuits energized from the main conductor 12 are protected by and in series with 120 volt branch circuit breakers 38a . . . 38c, that are connected to the bus 34. Similarly, the branch circuits energized from the main conductor 14 are protected by and in series with 120 volt branch circuit breakers 40a . . . 40c, that are connected to the bus 36.

The branch circuit loads energized from main conductor 12 are identified by reference characters 42a . . . 42c. The branch circuit loads energized from the main conductor 14 are identified by references characters 44a . . . 44c. Each of the loads is connected to the respective branch circuit breakers by conductors that extend from the circuit breaker box 20 to the remote location of these loads. Each of the loads 42a . . . 42c and 44a . . . 44c are connected to the neutral bus bar by appropriately insulated conductors 46a . . . 46c and 48a . . . 48c, respectively. The opposite side of each branch load is connected to the respective branch circuit breakers 38a . . . 38c, 40a . . . 40c, by way of conductors 50a . . . 50c and 52a . . . 52c, respectively. It will also be noted, at this point, that the grounding conductor normally employed in the branch circuit cables is omitted from the present disclosure for sake of clarity. In actual practice, this conventional safety feature would be employed.

Assuming for the moment that the conductors 50 were connected directly to the branch circuit breakers 38 and that the conductors 52 were connected directly to the branch circuit breakers 40, one would have a conventional electrical service with 120 volt branch circuits, each protected by a circuit breaker, conventionally rated at 15 or 20 amps.

At this point it is appropriately to take note of the characteristics of the circuit breakers referenced in the foregoing description.

It is contemplated the branch circuit breakers 38, 40 are commercially available circuit breakers of the type widely available in the United States and other countries. The basic principle governing the operation of a circuit breaker is based on current passing through a bimetallic element. When current from exceeds a rated value, the resistance of the bimetallic element causes an increase in its temperature, and this, in turn, causes the bimetallic element to flex. When the bimetallic element is thus flexed, a set of contacts is opened, thereby interrupting current flow through the circuit breaker to the associated electrical load. Flexing of the contacts is an energy related function in that the time required for the bimetallic element to flex to an open position is dependent on the extent to which current flow exceeds rated current flow.

Once the circuit breaker is tripped, to open its contacts, it is necessary to actuate a switch lever (illustrated but not identified by a reference character in FIG. 1) in order to reclose the contacts that were opened by flexing of the bimetallic element.

Circuit breakers have an inherent advantage over fuses in that they are reusable after being tripped and also in that they have the capability of carrying temporary excesses in rated current without tripping. This is to point out that many electrical loads, such as electric motors, have a low electrical resistance when first energized. This resistance very rapidly increases, but, there is an initial, short surge of "inrush" current, prior to the load stabilizing for steady state operation at a reduced, rated current level.

It is also to be noted that such conventional circuit breakers are so constructed that there is a coiled or partially coiled electrical flow path that generates a magnetic force. This magnetic force opens the contacts of the circuit breaker once a threshold value of current flow is reached. In this magnetic mode of operation, the circuit breaker operates in the same fashion as a relay.

As noted above, the present invention focuses on the hazards incident to "arc short circuit" currents which are of a magnitude sufficient to ignite combustible material, but are of a duration insufficient to cause flexing of the bimetallic element and tripping of a circuit breaker. It is also to be noted that "arc short circuit" current flows are not of a magnitude sufficient to magnetically trip a very substantial portion of existing circuit breakers.

Figure 9:
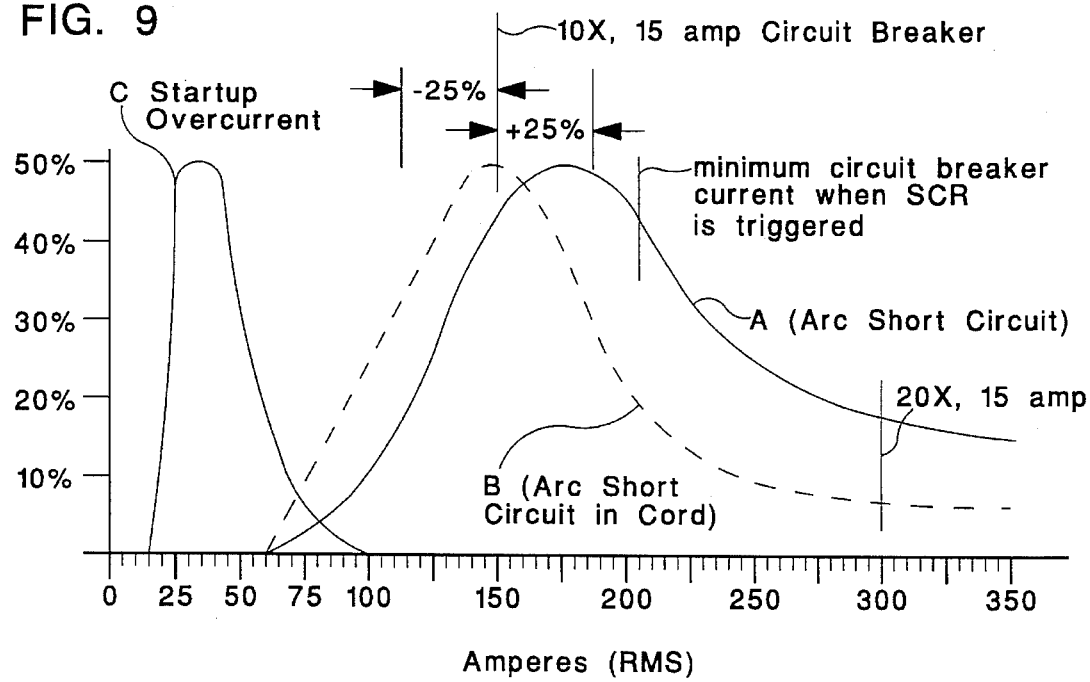
FIG. 9 is a graph illustrating the frequency of current flow magnitudes for startup overcurrents and "short circuit" arc currents.

Reference is made to bell curve A in FIG. 9, which illustrates the frequency distribution of "arc short circuit" currents. It will be seen that lowest current flow is approximately 60 amps. In 25% of the occurrences of an "arc short circuit" there will be 125 amperes, or less, in 50% of the occurrences of an "arc short circuit" there will be 175 amperes, or less and in 75% of the occurrences there will be approximately 250 amperes or less. Relating these statistics to effectiveness of protection, if a circuit breaker requires more than 250 amperes for magnetically tripping, then it provides protection against an electric fire in only 25% of the cases where an "arc short circuit" would occur, whereas, if the circuit breaker were capable of being magnetically tripped by 125 amperes, then it would be responsive in approximately 75% of the occasions in which an "arc short circuit" occurs and have an effectiveness of 75%.

The threshold level for "arc short circuit" flow is approximately 60 amps, this being the current level required to sustain an arc along a carbonized path (see discussion above). As has been pointed out, it is the heat generated by an arc that is the source of ignition. Axiomatically, if the current level is maintained below this threshold level, then this source of electric fires would be eliminated.

One approach to this problem would be to simply design a circuit breaker having a magnetic trip level below the threshold level for "arc short circuit" current flow. This is impractical for various reasons, primarily involving the fact that many electrical devices, in normal operation, or operation that does not create a hazard, draw temporary current overloads. A small percentage of these normal overload currents can have a magnitude that overlaps the low end of the range of "arc short circuit" currents.

Circuit breakers used in Europe approach the ideal of magnetically tripping at current flows below the minimum current flow at which an "arc short circuit" can be sustained. Most European circuit breakers have a 5× rating, so that a 15 amp circuit breaker will magnetically trip at 75 amps. Testing indicates that less than 2%–3% of "arc short circuits" have a current flow of 75 amperes or less. It is to be remembered that a fire is not initiated on every occasion of an "arc short circuit" being established, since other factors must be right for self sustaining combustion. With the low energy level of an "arc short circuit" current in the order of 75 amps or less, it is less likely that a self sustaining fire will be initiated, than when the "arc short circuit" current flow is at higher levels that would be effective in magnetically tripping a circuit breaker, either directly or pursuant to the means of the present invention. This is to point out that an acceptable level of safety (as opposed to an absolute guarantee) is provided where the circuit breaker will magnetically trip in response to a current magnitude of 75 amperes.

Circuit breakers in the United States have, at best, a 10× rating, meaning that a nominal 150 amperes is required to magnetically trip a fifteen amp circuit breaker. In United States 10× circuit breakers the accuracy of the magnetic rating varies by as much as ±25%, meaning that a 10× fifteen amp circuit breaker can magnetically trip at currents flows between 112.5 amps and 187.5 amps. Referencing again bell curve A, FIG. 9, it will be seen that, nominally this 10× circuit would not be tripped in some 57% percent of the occasion that an "arc short circuit" occurs, with a best case possibility of tripping occurring in 82% of the occurrences and a worst case possibility of tripping occurring in only 47% of the cases.

The existing situation is even worse in that there are other circuit breakers in wide spread use and still being marketed, which have a rating of 20× or more. To exemplify the potential hazard of these higher ratings, a circuit breaker with a 20× rating requires 300 amperes for magnetic tripping. This level of current is found in only 16% of arc short circuits and thus such circuit breakers would be ineffective in 84% of the occasions of an arc short circuit".

It is to be appreciated that the data base for curve A (and other curves later referenced) is limited, and that there can be some deviation from the specific amperage values or frequency of occurrence percentages specified. The data base is, however sufficient to establish the basic principles herein pertinent.

The present invention provides means for accelerating current flow to the end that circuit breakers will magnetically trip at currently levels less than that provided by the inherent construction of the circuit breaker. As a specific example, the present invention assures that a 10× fifteen amp circuit breaker will magnetically trip, when currently flow reaches 75 (5×) amperes, rather than the nominal 150 amperes.

Such ends maybe attained by a current accelerator unit 54 mounted at the output end of each circuit breaker 38, 40.

Each accelerator unit 54 comprises three circuit components, namely a silicon controlled rectifier (SCR) 56, a sensing resistor 58 and a current limiting resistor 60. The SCR and current limiting resistor 60 maybe standard, commercially available items. The sensing resistor 58 is characterized in that its resistance is accurately set at a value that is, usually, a non standard value and, further in that it has value that is essentially unaffected by changes in ambient temperature.

The accelerator unit 54, as illustrated, is adapted for mounting on a specific circuit breaker design, which lends itself to a stable mechanical construction that is relatively immune to damage from use or misuse.

From a physical standpoint the SCR 56 (FIGS. 5–7) comprises a cathode lead 62 and a gate lead 64 and an anode lead 66. The sensing resistor 58 comprises four lengths of metal wire characterized in that the metal has an essentially constant temperature coefficient of resistance. One end of the lengths of the resistor wires 58 is joined to a connector 68. The anode lead 62 is connected, as by soldering, to the connector 68. The opposite ends of the resistor wires 58 are joined by a connector 70 which secures an insulated lead wire 71 in conductive relation with the resistor wires 56. The current limiting resistor 60 is connected, at one end, to the SCR gate lead 64 and, at its opposite end, to the connector 70. The gate limit resistor 60 and its leads are encased within a heat shrunk, tube of insulating material 72. A second tube of insulating material 74 is heat shrunk to encase the resistor 60 and at least portions of the resistor 58 and extends to the insulation of lead wire 71.

The accelerator unit 54 further comprises a body portion 76 in which the SCR 58 is encapsulated with the anode lead 66 projecting therefrom. Portions of the wires of the sensing resistor 58 are also embedded in the body portion 76, with the sensing resistor connector 68 projecting therefrom. The molded, body portion includes a projection 78 that is angled upwardly and is provided with a cross section that approximates the outline of a recess formed in the side of the circuit breakers 38 or 40. With the described configuration of the accelerator unit body 76, the U-shaped portion of the connector 68 may be securely connected to the output of the circuit breaker by a binding screw 80, that is conventionally employed in connecting a load circuit conductor thereto.

The first electrical connection (indicated by reference character 82) with the acceleration unit 54 is thus provided through the connector 68.

The lead wire 71 is then connected to the appropriate load conductor 50 or 52, as by the use of a wire nut 86. This provides the second electrical connection with the acceleration unit 54, which connection is indicated by reference character 84.

The third electrical connection with the acceleration unit 54, indicated by reference character 88, is with the SCR anode lead 66. This connection is illustrated only schematically, it being well within the ability of one skilled in the art to provide the necessary, hardware for effecting such connections. The anode of the SCR is thus placed in electrical communication with an acceleration circuit, load resistor 90. The load resistor 90 is thus common for all of the acceleration units 54 to serve to limit current flow upon any of the SCR's being triggered to a conductive state, as will later be discussed in further detail.

While it is illustrated that connections for the several acceleration units 54, with the load resistor 90, is by way of separate conductors 92, 94, for the circuit breakers physically mounted on the opposite sides of the circuit breaker box 10. It is to be appreciated that the output connections 66, under each main circuit breaker (22 or 24) could be "daisy chained", i.e., using separate conductors extending, respectively, from one unit 54 to the next unit 54 and then to the next and then to the next and then to the short circuit, load resistor 90.

The function of the acceleration units 54 is to purposely trip a circuit breaker prior to current flow through a branch circuit reaching an energy level at which there is a significant probability that an "arc short circuit" fire will be initiated.

More specifically, the SCR 56 functions as a switch. The switch function is provided by the gate element being normally biased to a blocking state and the switch function is in an open condition. When the voltage drop across the sensing resistor 58 reaches a predetermined level, the SCR gate is biased to a level in which the SCR switch "closes" for flow of current through a purposefully established "acceleration circuit" that extends from the output side of the circuit breaker, through the SCR to the overload resistor 90 and then to the grounded, neutral bus 26.

The level of current flow selected to be indicative of an "arc short circuit" is sensed by the voltage drop across resistor 58, whereupon the SCR is in a "switch closed" condition for current flow through the acceleration circuit. Essentially instantaneously with the SCR becoming conductive, current flow through associated circuit breaker (38 or 40) increases by an increment equal to current flow through the acceleration circuit. This increase in current substantially increases the probability that the circuit breaker will be magnetically tripped by "arc short circuit" current flow, before there is sufficient energy available for the initiation of an electrical fire. In a specific sense, as will be shortly set forth, the acceleration current flow is, preferably, sufficient to assure tripping of 10× circuit breakers having a plus or minus tolerance of 25%. The circuit breaker is thus made responsive to relatively low amperage "arc short circuits", which could, otherwise initiate an electric fire.

When the SCR is conductive, the gate circuit also becomes conductive. This circuit is not designed for large current flows and for that reason the current limiting resistor 60 is provided. The resistor 60 has a large resistance typically, 10 ohms, requiring a small power rating, on the order of 0.25 watts. Such resistors are commercially available from various sources and are quite inexpensive.

It has been discovered that commercially available SCR's have characteristics that make them uniquely suitable for the protective purposes herein provided.

It is to be recognized that the function of sensing current flow represents a system loss. That is, whenever there is current flow, energy is wasted, as represented by the voltage drop across the sensing resistor. Commercially available SCR's are responsive to voltage drops of less than one volt. At normal branch circuit currents of 15 or 20 amps, the voltage loss across the sensing resistors is in the order of 0.012 volts and is insignificant, being in the same order as line losses between a circuit breaker box and an outlet receptacle.

Figure 8:
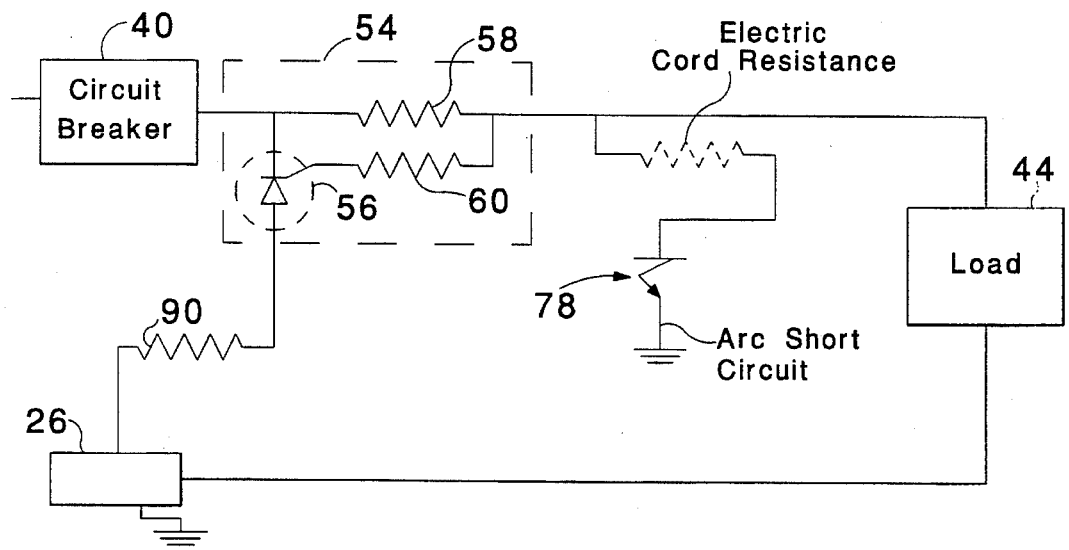
FIG. 8 is a simplified circuit illustrating the operating principles of the present invention.

The foregoing will be more evident from FIG. 8, which illustrates the operation of a single circuit breaker (40), current acceleration unit (54) and branch circuit load (44). For sake of illustration, the circuit breaker 40 has a 10×15 amp, magnetic trip rating. The short circuit is indicated at 78 and is indicated as occurring at some indefinite point between the acceleration unit (in the circuit breaker box) and the electrical load. Typically the short circuit would occur in a wiring cable such as nonmetallic sheathed romex cable, or in an appliance connecting cord.

The voltage drop across the sensing resistor 58, required to render the SCR 56 conductive, is a given, or constant, for a given SCR. The resistance of the sensing resistor therefore determines the level of branch circuit, current flow at which the SCR will become conductive. It is to be further noted that an SCR is responsive to the instantaneous voltage drop across the sensing resistor, as opposed to the root mean square (rms) value. Current and voltage values are conventionally specified in terms of the root mean square voltages, so that their peak values would be 1.414 times their nominal (rms) values.

Unique advantages are found in triggering the SCR (rendering it conductive) when branch circuit current flow reaches 75 amps (rms) (see above discussion regarding the initiation of an electric fire from an "arc short circuit" current of 75 amperes or less). The end of triggering the SCR in response to current flow of 75 amperes, may be obtained by a sensing resistor 58 having a resistance of 0.0067 ohms. With 75 amp (rms) current flow having a peak value of 106 amps, a drop of 0.71 volt is generated across the resistor 58, this being the triggering voltage for the SCR. Once the SCR is rendered conductive, positive pulses of current pass therethrough (as acceleration current flow) with no more than minimal resistance.

While the value of the resistor 58 establishes the minimum current flow required for triggering the SCR 56 and initiation of acceleration circuit current flow, the current flow through the circuit breaker, by way of the acceleration circuit, i.e, through the SCR, is set by the load (limit) resistor 90, which has a preferred value of 0.91 ohms. One of the factors dictating the selection of this value is that commercially available resistors having a 25 watt rating (required by the high energy level involved) have this specific value. The level of acceleration current flow is otherwise dictated by the current carrying capacity of the SCR. This, again, is an economic factor. Relatively inexpensive SCR's are commercially available with short term current carrying capacities in the order of 140 amps. The 0.91 ohm resistor limits acceleration circuit current flow to 132 amps (rms), neglecting other losses in the circuit breaker itself and the SCR.

At this point, it will be noted that, it is to be understood that when the amperage capacity of an SCR is maintained below approximately 140 amps, the cost of the SCR can be minimized. For that reason, the preferred capacity of the SCR's used herein is 140 amperes. It is further to be noted that the capability of using this inexpensive SCR is achieved by reason of the fact that it is called upon to carry current only on positive half cycles and then, usually, for one or, at most, two half cycles, in order to trip the associated circuit breaker. Put another way, the maximum time that SCR will be conductive is in the order of 0.008 second. The short term, high current loading is obtained with an SCR having a long term rating of 8 amperes.

Thus, when an "arc short circuit" occurs and its current flow reaches the 75 amp level, the SCR is triggered so that there is parallel current flow through the acceleration circuit at a level of 132 amps. There is thus, a minimum of 207 amps drawn through the circuit breaker when the SCR is triggered. By referencing FIG. 9, it will be seen that a current flow of 207 amps is sufficient to magnetically trip the least sensitive of 10× fifteen amp circuit breakers. The present acceleration unit is thus effective in rendering 10× fifteen amp circuit breakers responsive to 98% of "arc short circuit" current flows, as opposed to such circuit breakers having a best case responsiveness of 82% and a worst case responsiveness of only 48%. Expressed in different terms, the defined acceleration unit has the capability of increasing the responsiveness of a 13.8× circuit breaker from 30% to 98%. The latter conclusion is based on the fact that upon the SCR being triggered by a 75 amp current, there is a resultant 207 amps drawn through the circuit breaker. If the circuit breaker required 207 amperes to magnetically trip (13.7 times the 15 ampere rating) such current flow would occur in only 30% of "arc short circuits" and the 13.7 circuit breaker would be ineffective in providing protection in some 70% of the occurrences of an "arc short circuit".

Also, remembering that "arc short circuit" current flow is drawn through the circuit breaker, the responsiveness of a 20× circuit breaker (requiring a magnetic tripping amperage of 300 amps) is increased from 17% to better than 50%. This is to again emphasize that once the SCR is triggered, there is a 132 ampere increment to circuit breaker current, which is added to current flow through the "arc short circuit". In 52% of "arc short circuits" there will be a current flow of at least 168 amperes, this added to 132 amperes in the acceleration circuit induces sufficient current to magnetically trip a 20× circuit breaker. (The percentages given are approximations only, but do reflect the relative increase in responsiveness provided by the present invention.)

However, in 48% of the "arc short circuits", there will be insufficient current, even with the added SCR flow of 132 amps, to magnetically trip the 20× circuit breaker. While the 20× circuit breaker will eventually trip through its thermal mechanism, the described, inexpensive SCR would be triggered for an excessive length of time, causing it to be burned out. Thus the preferred embodiment of the invention, based on the use of a single, inexpensive SCR, for each acceleration unit, is limited to circuit breakers which can be magnetically tripped by the combined SCR and "short circuit" current flow—in the embodiment just described, this would be a 13.7× rated circuit breaker.

Using the same inexpensive SCR, the acceleration unit can be used to trip higher rated circuit breakers by increasing the current flow at which the SCR is triggered. In doing so, there would be a reduction of the responsiveness of the acceleration unit to low "arc short circuit" currents. (See later discussion of increasing the current flow at which the SCR is triggered, for purposes of minimizing nuisance tripping of the circuit breakers).

Acceleration units can also be used to magnetically trip circuit breakers having higher ratings and requiring more than 132 amps of SCR current flow, by employing an SCR having a greater current carrying capacity and/or employing SCR's in parallel. In either case, with present SCR technology, there would be a significant increase in cost.

The inherent magnetic tripping characteristics of circuit breakers contribute to the feasibility of the present invention. This is to say that, in the usual case, once the threshold tripping level is reached, only one or two current cycles is required for tripping to occur. Such quick reaction is essential to maintaining "arc short circuit" current energy below a level at which ignition of combustible material will occur.

Further to the earlier discussion of the preferred, short term current carrying capacity of the SCR and the economics incident thereto, the magnetic tripping characteristics directly relate to the economic feasibility of the invention. The referenced SCR (available from Powerex Inc., Youngwood, Pa. and identified as CR8AM-12, Lead Mount, Phase Control SCR) is called upon to carry the acceleration circuit current for only a very limited number of cycles, usually one or two cycles, although it is capable of carrying such current for up to 15 half cycles.

ha normal circumstances, the operational characteristics of the SCR, as well as the other components of the acceleration unit 54 arc unaffected by the occurrence of an "arc short circuit".

It is to be appreciated that SCR's having a higher current carrying capacity or employed in parallel, could be employed to increase acceleration circuit current to a level sufficient to magnetically trip circuit breakers, having an undefined upper limit for tripping current, in response to branch circuit flows of 75 amps, or even less. At the present time, the upper limit on current flow is one of economics, with SCR's having a short term current rating of no more than about 140 amps providing significant advantage.

On the subject of economics, it is to be noted that the 0.91 ohm acceleration circuit load resistor 90 is a relatively expensive item. If a separate load resistor were employed for each acceleration unit, the additional cost would significantly impact acceptance of the invention. The capability to employ a common acceleration circuit load resistor stems from the very brief period in which there would be current flow. "Arc short circuits" are, in real life, rare occurrences. It is highly unlikely, even though not statistically impossible, for two "arc short circuits" to occur at the same time. Taking into account that a circuit breaker will normally trip within one or two cycles of acceleration circuit current, energization of two SCR's on the same cycle is most unlikely. The odds against simultaneous energization of two acceleration unit circuits at the same time are further increased by the fact that half of the branch circuits are normally on one phase and the other half arc on an opposite phase. The use of SCR's as opposed to the use of triacs (as in my earlier U.S. Pat. No. 4,858,054) prevents a short circuit between the circuits derived from the conductors 12 and 14, should acceleration units, energized from both, be triggered at the same time.

One further point to note is that the flow induced through the circuit breaker is a worst case condition insofar as effectiveness of the acceleration unit is concerned. This is to point out that, up to 15 additional amps may be drawn through the circuit breaker to assist in its magnetic tripping. Thus, if an "arc short circuit" should occur at time current is drawn through the branch circuit load 44, the SCR 56 could be tripped by "arc short circuit" current as low as 60 amps. This factor further enhances the effectiveness of the acceleration unit and can increase its responsiveness to 100% of current flows that are capable of initiating an "arc short circuit" fire. Alternatively, the same factor would permit an increase, of up to 15 amps, in the current flow required to trigger the SCR, without a serious degradation in the effectiveness of the acceleration unit. In the latter case, the current flow through the branch circuit is proportionately increased and a higher level of current flow is available to trip the circuit breaker.

Curve A in FIG. 9 represents current flows in "arc short circuits" occurring under circumstances where line losses are ignored. The introduction of any substantial line resistance in series with the "arc short circuit" reduces the current frequency distribution, as is depicted in broken line bell curve B in FIG. 9. Curve B depicts the effects of the "arc short circuit" occurring between conductors at the end of a 6 foot appliance connecting cord comprising 18 AWG copper conductors. It is also to be appreciated that similar relationships exist where the branch circuit cables are of substantial length, providing electrical service at a location remote from the circuit breaker box.

The effectiveness of circuit breakers in this case is substantial less than previously described. In only some 8% of "arc short circuits" will there be 75 amps. This means that a 5× circuit breaker will have a reduced effectiveness of 92% (v. 98%). The same reduction in the effectiveness of the acceleration unit 54 occurs, in that there will be 8% of the occurrences of an "arc short circuit" in which the SCR will not be triggered, and therefore an effectiveness of 92% is obtained. Again, based on experience with 5× circuit breakers, "arc short circuit" current flow in the order of 75 amps, or less, has not been known to actually initiate an electrical fire. Thus, the increase of the likelihood of "arc short circuit" currents of 75 amps, or less, from 2% to 8% does not have any significant impact on the effectiveness provided by an acceleration unit that is not responsive to such low level currents.

Curve B also evidences the reduced effectiveness of a 10× circuit breaker. In a best case, there will be an effectiveness of 65% (v. 82%), a nominal effectiveness of slightly less than 50% (v. 57%) and a worst case of 28% effectiveness (v. 47%).

On the other hand, the acceleration unit 54 provides even greater improvement in the prevention of fires initiated by "arc short circuits". This is to point out that with a tripping current of 75 amps and an acceleration current of 132 amps, a 13.8× circuit breaker will be tripped in 92% of the occurrences of "arc short circuits" (curve B), whereas the required 208 amps required to magnetically trip a 13.8× circuit breaker would be available in only 17% of the occasions of an "arc short circuit" at the end of a six foot connecting cord, without an accelerator.

The next factor to be discussed goes to nuisance tripping of a circuit breaker. FIG. 9 includes a third bell curve C, which indicates the frequency distribution of inrush currents that are encountered in the normal operation of a wide variety of electrically powered devices. It is to be observed that more than 90% (and more in the order of 98%) of the inrush of temporary overload currents are below the selected 75 amp value at which the SCR (56) is triggered. Thus there is a very low probability that a normal inrush current will have a magnitude sufficient to trigger the SCR 56 and trip the circuit breaker when, in fact, there is no "arc short circuit". If, in a particular installation, there is a load that normally draws, as in start up energization, "inrush" currents sufficient to trigger the SCR and trip the circuit breaker, then the level of current required to trigger the SCR can be increased by a moderate amount. Since there is only a small portion of the bell curves that overlap, maximum, normal inrush currents can be accommodated, without nuisance tripping, while at the same time the decrease in the effectiveness of the acceleration unit in protecting against an "arc short circuit" fire is only minimally affected.

Figure 10:
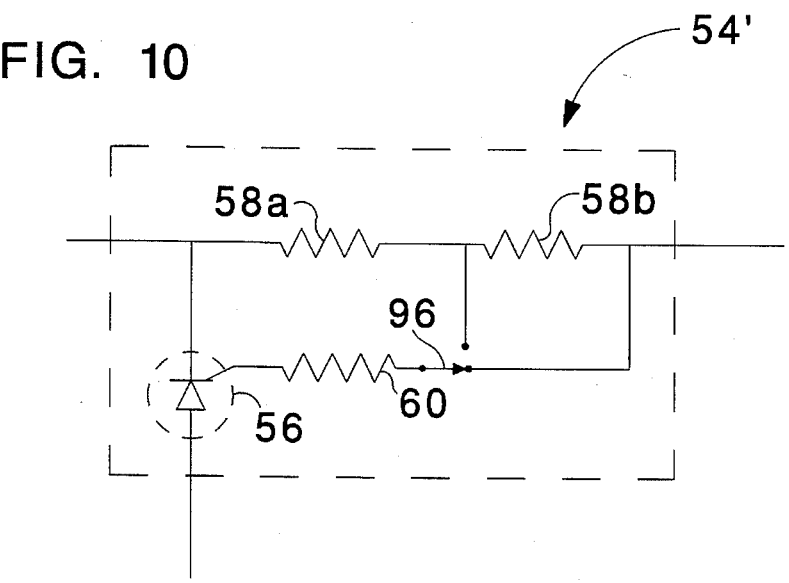
FIG. 10 is a simplified circuit of an alternate acceleration unit.

FIG. 10 schematically illustrates an acceleration unit 54' which permits accommodation of normal inrush and temporary overload currents that exceed 75 amps. The components of this unit are the same as in the unit 54, excepting that the sensing resistor comprises two components 58a and 58b. Sensing resistor 58a has a resistance of 0.0048 ohms and the sensing resistor 58b has a resistance of 0.0019 ohms. The total is the same as before, namely 0.0067. Initially the limit resistor 60 is connected at the downstream end of the resistor 58b so that when there is 75 amps of current flow through the branch circuit, the gate of SCR 56 will be biased to 0.71 volts and the SCR triggered for conduction of acceleration current flow.

Where nuisance tripping occurs, the level of current required to trigger the SCR can be increased by connecting the resistor 60 to the downstream end of sensing resistor 56a. This end can be attained through the provision of a switch 96. With the switch 96 closed, 105 amps (rms—148 amps peak) is required to provide a 0.71 voltage drop and triggering of the SCR. The acceleration unit is thus rendered insensitive to normal overload currents up to 105 amps. The increased level of current flow for triggering the SCR should completely eliminate nuisance tripping. In obtaining a reduction in nuisance tripping, there is a modest reduction in the effectiveness of the acceleration unit in that it will be responsive to 85% of "arc short circuit" currents as opposed to 98% when the triggering current is 75 amps. On the other hand, the acceleration current will be increased to the end that circuit breaker current flow will be sufficient to magnetically trip circuit breakers requiring as much as 250 amps (16.7×).

One of the key factors in the effectiveness of the present invention is the capability of being able to trigger the SCR within a very close tolerance to a maximum permissible branch circuit current flow. In part this capability, is attributable to the inherent characteristics to the referenced, commercially available SCR's. Empirical data establishes that the tolerance of triggering voltages is in the order of ±1% to ±2%.

A further factor in accurately triggering the SCR when branch circuit flow reaches the desired triggering value (75 or 105 amps) is found in the essentially zero temperature coefficient of the sensing resistor 56 (the resistors 56a, 56b would be constructed in accordance with the same teachings). In order to obtain a desired accuracy in triggering the SCR, it is also necessary that resistance of the sensing resistor 56 be held within a close tolerance. It is also to be appreciated that the microresistance values required for the current sensing function are not commercially available, at least at economical prices.

The requirements of a sensing resistor are uniquely provided through the use of a metal wire having a relatively high resistivity and, more importantly, an essentially zero temperature coefficient, to the end that the triggering voltage drop is a constant, regardless of ambient temperature. Such ends are provided through the use of wire formed of an alloy known as constantan and available from various commercial sources.

Constantan is an alloy having the following constituents:

| | |
|---|---|
| Copper | 55% |
| Nickel | 45% |
| Iron, Manganese | Trace Amounts |

The pertinent characteristics of this alloy are as follows:

| | |
|---|---|
| resistivity | 47 micro-ohm-centimeter |
| temperature coefficient | .00001 ohm/ohm/°C. |

Economies can be realized in utilizing commercial available diameters of constantan wire. This approach is illustrated in the acceleration unit 54 described in with reference to FIGS. 4–7. There the desired resistance is provided by constantan wires having a diameter of approximately 0.037 inch, with four wires, in parallel, having an effective length of 0.75 inches. The effective length of the constantan wires can be readily established by the spacing between the connectors 68, 70, which have a minimal resistance, at the opposite ends of the wires.

Figure 11:
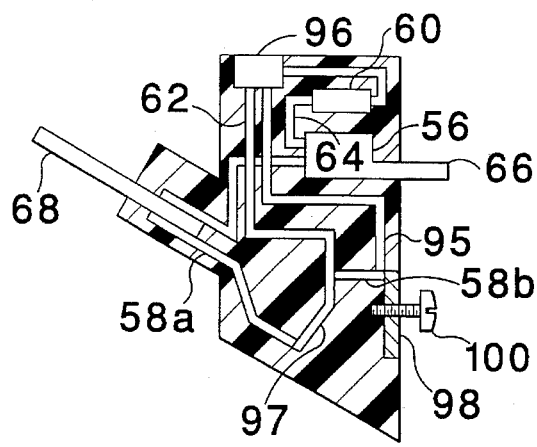
FIG. 11 is a cross section illustrating construction of an integral mounting unit for the elements illustrated in FIG. 11.
Figure 12:
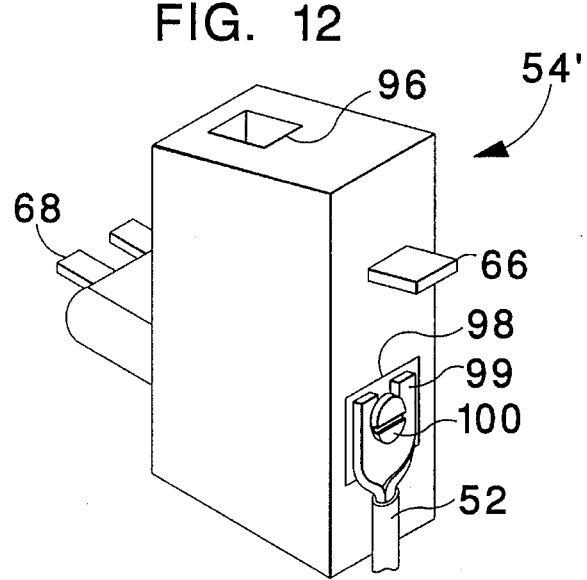
FIG. 12 is a perspective view of the unit seen in FIG. 11.

The physical construction of acceleration unit 54 is illustrated in FIGS. 11 and 12. By employing resistors 58a, 58b, formed by single lengths of constantan, it is possible to wholly encapsulate all of the electrical components of the acceleration unit 54, including a relatively inexpensive dip switch 96 to provide the switching function, where there is a load that causes nuisance tripping of the associated circuit breaker (38 or 40).

The cathode lead 62 of the SCR 56 again connects directly to the connector 68, which may also be soldered to the upstream end of the resistor 58a. A conductor 97 extends from the downstream end of the sensing resistor 58a to the upstream end of the sensing resistor 58b and then to the dip switch 96, The gate lead 64 of the SCR is connected to the upstream end of the limit resistor 60, which, in turn, is connected to the switch 96. The switch 96 is also connected to the downstream end of the sensing resistor 58b by conductor 95 and to a contact plate 98.

The acceleration unit is thus encapsulated in an appropriate resinous material and provided with the projection 78 that locates it with respect to any of the circuit breakers (38 or 40) to permit it to be mounted in a stable relation thereon through the use of the binding existing binding screw (that conventionally connects a branch circuit conductor thereto) to engage the conductor 68. The acceleration unit 54' also enables connection of the branch circuit connectors (50 or 52) directly thereto. In FIG. 12 a conductor 52 is illustrated with a connector 99 mounted thereon and clamped against the contact plate 98 by a binding screw 100. The binding screw 100 is equivalent to the wire nut 71 of the previous embodiment in providing a second connection (84) with the acceleration unit, which second connection is the current output to the branch circuit load. The resinous material encapsulating the acceleration unit 54' is preferably flame retardant—many flame retardant materials including phenolic and epoxy, resins are known to those skilled in the art.

The anode 66 of the SCR, as before, projects from the body portion of the unit 54' for connection with the common current limiting resistor 90.

It will be noted that, when the unit 54' is mounted on a circuit breaker, the switch 96 is readily available to switch the current flow at which the associated SCR will trip. The provision of the switch 96, and its ready accessibility, facilitate trouble shooting in the event of circuit breaker tripping. Thus, if tripping occurs, the switch 96 can be actuated to trip at a higher level of current flow. If a very fist trip of less than a second continues, since all "normal inrush overcurrents" can no longer trip the circuit breaker, it can then be assumed that there is an "arc short circuit" problem, unless it can be determined that some other case of tripping exists. Having identified the probability of an "arc short circuit" problem, a high resistance ohm meter (known as a "megger") can be used to identify, the particular portion of the load circuit in which corrective action is required.

The more usual tripping problem occurs when too many loads are plugged into a branch circuit. This overload problem can be recognized by the fact that the circuit breaker will take from many seconds to a few minutes to trip again, after it is reset. Overloads consisting of too many properly functioning loads on a circuit, seldom draw more than 25–40 amperes. Therefore, it takes seconds or minutes for the circuit breaker to trip.

Figure 14:
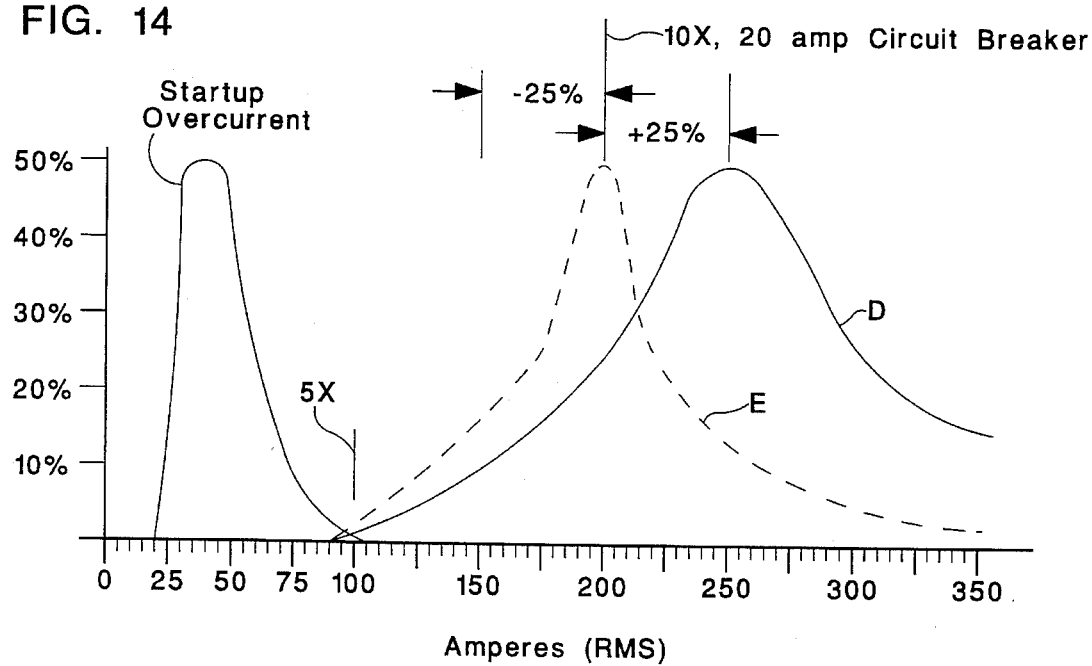
FIG. 14 is a graph similar to FIG. 9 illustrating corresponding current flows for 20 ampere, branch circuits.

Reference is next made to FIG. 14 and bell curve D which illustrate the frequency distribution of current flows in "arc short circuits" occurring in branch circuits protected by 20 amp circuit breakers. It is to be noted that 20 amp branch circuits are energized by way of heavier gauge load conductors (than 15 amp service) and have lower, inherent circuit resistance. While the threshold for establishing an arc along a carbonized path is in the order of 60 amperes (see above discussion) in 20 ampere load circuits, the incidence of current flows at this low level is so low that it can be, essentially, ignored. The meaningful incidence of "arc short circuits", in 20 amp load circuits, does not occur below 80 amps, as indicated in FIG. 14.

It will be seen that in 20 amp load circuits, employing 10×20 amp circuit breakers, the responsiveness to "arc short circuit currents" is significantly higher than in 15 amp circuits. Thus, there is a nominal responsiveness of 75%, with a best case responsiveness of 90% and a worse case responsiveness of 52%, for the ±25% tolerance that are found in these 10× circuit breakers. However, when account is taken of connecting cord resistance, the potential for "arc short circuit" currents sufficient to initiate an electric fire is only modestly improved, as is evidenced from curve E (corresponding to curve B in FIG. 9). It will be seen that for this type of "arc short circuit" hazard, the 10× circuit breaker (requiring 200 amps to magnetically trip) is effective in only 50% of the occurrences of an "arc short circuit", with a best case effectiveness of 85%, but a worst case effectiveness of less than 25%.

It is thus apparent that there is a significant increase in effectiveness in obtaining protection to be gained through the use of acceleration units or the present invention in 20 ampere load circuits. Further, though not specifically described herein, benefits may be gained through the use of acceleration units of the present invention in load circuits carrying even higher currents.

Figure 13:
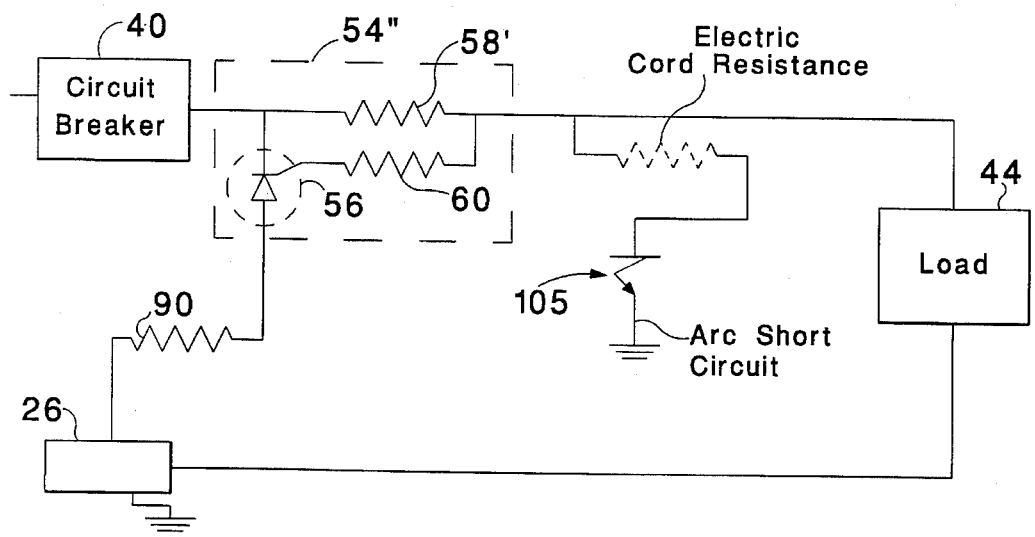
FIG. 13 is a simplified circuit illustrating the operating principles of the present invention, related to its use in 20 ampere, branch circuits.

FIG. 13 is a circuit diagram for an acceleration unit 54" that is adapted for use in 20 amp load circuits. For economic reasons, it is preferred to employ an SCR 56 having the same characteristics as in the previously described acceleration units. Therefore, the acceleration unit will be limited to the same acceleration circuit current limit of 132 amperes. The same acceleration current limiting resistor 90 is then appropriate for use. In fact this is a further advantage of the present invention in that there can be both 15 and 20 amp load circuits/circuit breakers originating from the same circuit breaker box, all employing a single, common current limiting resistor 90.

The sensing resistor 58' is the only element of the acceleration unit 54' that is changed for a 20 amp circuit. Specifically, the resistance of the resistor 58' is 0.0048 ohms, again employing constantan or other similar material having an essentially zero temperature coefficient. This resistance value produces the SCR triggering voltage of 0.71 volts when circuit current flow reaches 105 amps (rms—148 amps peak).

The triggering current value of 105 amps was chosen with the same general considerations that dictated selection of 75 amps as the triggering current level for the 15 amp circuits, first described. This is to say that the incidence of "arc short circuits" having such low current flows is insignificant mad the energy level is such that there is an extremely low probability that an electric fire would occur, it there was a failure to trip the circuit breaker. Further, as will be seen, normal overcurrent excursions remain primarily below the 105 ampere level. With the triggering amperage at the 105 amp level, it is not necessary to provide means for increasing triggering current level to accommodate specific loads, as described in connection with FIGS. 10-12.

From FIG. 14, it will also be seen that the benefits of providing the acceleration unit 54" are similar to those previously described in connection with 15 amp circuits. Thus, when the SCR 56 is triggered, there will be a minimum of 237 amperes flowing through the associated circuit breaker. 237. The SCR will be triggered in 95% of the occurrences of an "arc short circuit" and provide a minimum of 237 amps for magnetically tripping the circuit breaker. This is sufficient to trip an 11.8× circuit breaker. Upon a minimal increase in short circuit flow, amperage will increase to the level of 250 amps, sufficient to trip a worst case 10×20 amp circuit breaker, increasing its effectiveness to 95% form 50% (curve D) and to 90% from 23% (Curve F).

Variations from the embodiments herein specifically described will be apparent to, and will occur to those skilled in the art, within the spirit and of the invention and should be deemed within the scope of the following claims.

To summarize the benefits of the present invention, the described acceleration units are triggered by branch circuit currents found in the vast majority of "arc short circuits" to essentially instantaneously increase circuit breaker current an incremental amount that is sufficient to magnetically trip the circuit breakers that would otherwise be magnetically tripped in a substantially decreased number of occasions of an "arc short circuit". Typically, the circuit breakers can be effective in 90%–98% of the occurrences of an "arc short circuit", wherein the same circuits breakers (requiring different multiples of rated current) would be responsive in as few as 25% of the occasions of an "arc short circuit".

Having thus described the invention, what is claimed as novel and desired to be secured by Letters Patent of the United States is:

1. An electric service installation compromising,
    A. a circuit breaker box,
    B. an incoming electrical service connection
        extending into said circuit breaker box, and comprising
            two energized conductors of opposite phase and
            a neutral conductor with respect to which the energized conductors have a potential that is half the potential between the two energized conductors,
    C. a pair of main circuit breakers,
        mounted in said circuit breaker box, to which the energized conductors are, respectively, connected,
    D. a pair of main buses, respectively connected to the output of each of the main circuit breakers,
    E. a neutral bus,
        mounted in said circuit breaker box, to which the neutral conductor is connected,
    F. a plurality of branch circuit breakers connected to each of said main buses, each branch circuit breaker having
        a current rating which has a relatively low magnitude, and
            a magnetic trip mode which is actuated by current flow exceeding a threshold value that is a several times multiple of the current rating for the circuit breaker,
    G. a plurality of branch circuit cables extending into the circuit breaker box, each branch circuit cable in said first set comprising
        a first cable conductor connected to the neutral bus and
        a second cable conductor energized from one of the branch circuit breakers,
            whereby separate branch circuit loads may be, respectively, energized from said cable,
    said electric service installation being characterized by
    H. acceleration means for enhancing operation of the branch circuit breakers to provide protection against the hazards of "arc short circuits" having a current flow which randomly varies in magnitude pursuant to a bell shaped frequency distribution curve, upwardly from a minimum threshold value,
        said acceleration means being actuated in response to overcurrent flow, in any branch circuit cable, exceeding the threshold value for an "arc short circuit",
        said acceleration means including
            means, responsive to such overcurrent flow, for substantially instantaneously increasing current flow through the branch circuit breaker that is connected to the branch circuit cable in which such overcurrent has occurred,
        whereby the circuit breaker will be magnetically tripped by branch circuit current flows substantially less than arc otherwise required for magnetic tripping, and
        the acceleration means include acceleration current bypass circuit means connecting the output of each branch circuit breaker to the neutral bus, and
        electric switch means associated with each branch circuit breaker and having a normally open condition preventing acceleration circuit flow from the branch circuit breaker with which it is associated,
        each electric switch means being responsive to the current flow, in its branch circuit cable, exceeding the threshold value for an "arc short circuit", to shift to a closed position in which there is current flow through the acceleration circuit,
    further characterized in that
        the acceleration current bypass circuit means includes common load resistor means for limiting the current from through the bypass circuit means for a plurality of branch circuit breakers, regardless of which electric switch means for of bypass circuit means of the plurality of branch circuit breakers may be shifted to a closed condition.

2. An electric service installation as in claim 1 wherein the plurality of branch circuits comprise a first set of branch circuit breakers connected to one main bus, and a second set of branch circuit breakers connected to the other main bus, and further characterized in that the electrical switch means for the branch, circuit breakers of both the first and second set of branch, circuit breakers are connected to the neutral bus through a common resistor means.

3. An electric service installation as in claim 2 wherein each electric switch means is an SCR, and the common resistor means is a single resistor.

4. An electric service installation as in claim 1, further characterized in that the electric switch means associated with each branch circuit breaker comprises an SCR having an anode, a cathode, and a gate said SCR being triggered to a conductive, closed condition in response to a predetermined voltage potential between the gate and anode, and further including sensing resistor means, means connecting the SCR cathode and one end of the sensing resistor means to the output of the associated branch circuit breaker, means connecting a downstream portion of the sensing resistor means to the second cable conductor which is to be energized from the associated branch circuit breaker, means for connecting the SCR gate to a downstream portion of the sensing resistor means so that the potential between the gate and the anode is proportionate to the magnitude of current flow through the branch circuit cable energized from the associated branch circuit breaker, said means for connecting the SCR gate to the sensing resistor means including a resistor for limiting current flow when the SCR is conductive, and means for connecting the SCR anode to the common, load resistor, and further wherein the resistance of the sensing resistor means is selected so that it creates a triggering voltage potential, when the current flow exceeds the threshold value for an "arc short circuit".

5. An electric service installation as in claim 4, wherein the branch circuit breakers include a binding screw for securing an electrical connector to the output thereof, further characterized in that the SCR, sensing resistor means and gate limit resistor, associated with each branch circuit breaker, are interconnected as an integral unit, and each such unit includes a projecting connector connected to the SCR cathode and the sensing resistor means, said projecting connector being adapted to be secured to the associated branch circuit breaker by the binding screw thereof.

6. An electric service installation as in claim 5, further characterized in that each unit comprises a resinous block in which the SCR, sensing resistor means and gate limit resistor are potted, and binding screw means to which the sensing resistor means is connected and which is are adapted for the connection of the second cable conductor thereto.

7. An electric service installation as in claim 6, wherein each branch circuit breaker includes a recess in which the binding screw therefor is disposed, further characterized in that each resinous block includes a projecting portion adapted to be received in the recess of the associated branch circuit breaker, the connector for the SCR anode projecting outwardly from said resinous block projection and being adapted to underlie the binding screw of the branch circuit breaker when the resinous block projection is inserted into the branch circuit breaker recess.

8. An electric service installation as in claim 1, further characterized by sensing resistor means associated with each branch circuit breaker and in series with the second conductor of the branch cable energized from that branch circuit breaker, and wherein the electric switch means is responsive to a predetermined voltage drop across said sensing resistor means, and further characterized in that the sensing resistor means is formed of material having an essentially zero temperature coefficient.

9. An electric service installation as in claim 4, further characterized in that each sensing resistor means is formed of material having an essentially zero temperature coefficient.

10. An electric service installation as in claim 9, further characterized in that the sensing resistor means are formed of constantan.

11. An electric service installation comprising,

A. a circuit breaker box,

B. an incoming electrical service connection extending into said circuit breaker box, and comprising two energized conductors of opposite phase and a neutral conductor with respect to which the energized conductors have a potential that is half the potential between the two energized conductors, C. a pair of main circuit breakers, mounted in said circuit breaker box, to which the energized conductors are, respectively, connected, D. a pair of main buses, respectively connected to the output of each of the main circuit breakers, E. a neutral bus, mounted in said circuit breaker box, to which the third, neutral conductor is connected, F. a plurality of branch circuit breakers connected to each of said main buses, each branch circuit breaker having a current rating which has a relatively low magnitude, and a magnetic trip mode which is actuated by current flow exceeding a threshold value that is a several treats multiple of the current rating for the circuit breaker, G. a plurality of branch circuit cables extending into the circuit breaker box, each branch circuit cable comprising a first conductor connected to the neutral bus and a second conductor energized from one of the branch circuit breakers, whereby separate branch circuit loads may be, respectively, energized from said cable, said electric service installation being characterized by H. acceleration means for enhancing operation of the branch circuit breakers to provide protection against the hazards of "arc short circuits" having a current flow which randomly varies in magnitude pursuant to a bell shaped frequency distribution curve, upwardly from a minimum threshold value, said acceleration means being actuated in response to overcurrent flow, in any branch circuit cable, exceeding the threshold value for an "arc short circuit", said acceleration means including means, responsive to such overcurrent flow, for substantially instantaneously increasing current flow through the branch, circuit breaker that is connected to the branch circuit cable in which such overcurrent has occurred, whereby the circuit breaker will be magnetically tripped by branch circuit current flows substantially less than are otherwise required for magnetic tripping, wherein the branch circuit breakers require a current flow for magnetic tripping that is greater than the current flow that occurs in 40% of the occurrences of an "arc short circuit", and further characterized in that the acceleration means is actuated in response to current flow occurring in at least 90% of the occasions of an "arc short circuit".

12. An electric service installation as in claim 11, wherein the branch circuit breakers nominally require ten times rated current flow in order to be magnetically tripped, further characterized in that the acceleration means is actuated in response to current flow reaching a level five times rated current flow.

13. An electric service installation as in claim 12, wherein the branch circuit breakers have an accuracy of ±25% with respect to the level of current required for magnetic tripping, and further characterized in that each acceleration means, upon being actuated, increases the magnitude of current flow through the associated branch, circuit breaker to a magnitude of at least 12.5 times rated current flow.

14. An electric service installation as in claim 11, further characterized by means for selectively varying the magnitude of current flow required by each acceleration means for its actuation, whereby a higher current flow can be set for actuation of the acceleration means, where there are normal overload currents that fall within the lower range of "arc short circuit" currents.

15. An electric service installation as in claim 11, wherein the energized conductors of the incoming electrical service have an alternating current potential of 120 volts with respect to the neutral conductor, and the branch circuit breakers have a current rating of 15–20 amperes, and further characterized in that the acceleration means is responsive to the peak current flow through a cable conductor exceeding the threshold value for "arc short circuit" current and is also responsive in no more than two half cycles of such peak current flow.

16. An electric service installation comprising,

A. a circuit breaker box,

B. an incoming electrical service connection extending into said circuit breaker box, and comprising two energized conductors of opposite phase and a neutral conductor with respect to which the energized conductors have a potential that is half the potential between the two energized conductors, C. a pair of main circuit breakers, mounted in said circuit breaker box, to which the energized conductors are, respectively, connected, D. a pair of main buses, respectively connected to the output of each of the main circuit breakers, E. a neutral bus, mounted in said circuit breaker box, to which the neutral conductor is connected, F. a plurality of branch circuit breakers connected to each of said main buses, each branch circuit breaker having a current rating which has a relatively low magnitude, and a magnetic trip mode which is actuated by current flow exceeding a threshold value that is a several times multiple of the current rating for the circuit breaker, G. a plurality of branch circuit cables extending into the circuit breaker box, each branch circuit cable comprising a first conductor connected to the neutral bus and a second conductor energized from one of the branch circuit breakers, whereby separate branch circuit loads may be, respectively, energized from said cable, said electric service installation being characterized by H. acceleration means for enhancing operation of the branch, circuit breakers to provide protection against the hazards of "arc short circuits" having a current flow which randomly varies in magnitude pursuant to a bell shaped frequency distribution curve, upwardly from a minimum threshold value, said acceleration means being actuated in response to overcurrent flow, in any branch circuit cable, exceeding the threshold value for an "arc short circuit", said acceleration means including means, responsive to such overcurrent flow, for substantially instantaneously increasing current flow through the branch circuit breaker that is connected to the branch circuit cable in which such overcurrent has occurred, whereby the circuit breaker will be magnetically tripped by branch circuit current flows substantially less than are otherwise required for magnetic tripping;

wherein the energized conductors of the incoming electrical service have an alternating current potential of 120 volts with respect to the neutral conductor, and the branch circuit breakers have a current rating of 15–20 amperes, and further characterized in that the acceleration means comprise
an acceleration bypass circuit extending from the output of each branch circuit breaker to the neutral bus,
a normally non-conductive SCR
disposed in series with each acceleration bypass circuit,
triggered to a conductive state by a predetermined potential between its cathode and gate,
with a cathode connection to the output of the associated branch circuit breaker;
sensing resistor means connected, respectively, with the output of each branch circuit breaker and in series with the second cable conductor energized therefrom, said sensing resistor means being connected across the cathode and gate of the SCR for the associated branch circuit,
whereby the potential between the SCR cathode and gate is proportional to the magnitude of current flow through the associated branch circuit cable, and the SCR is triggered to a conductive state to thereby actuate the acceleration means,
further characterized in that
the SCR's are triggered by a cathode/gate potential of no more than approximately 0.75 volts, and
further characterized by
means for limiting acceleration bypass circuit current flow to no more than about 140 amperes.

17. An electrical service installation as in claim 16,
further characterized in that
the means limiting bypass current comprise
a single load resistor, and
the anodes of the SCR's are connected to the upstream end of the single load resistor, the downstream end of which is connected to the neutral bus.

18. An electrical service installation as in claim 17,
further characterized in that
each sensing resistor means has a resistance of approximately 0.0057 ohms.

19. An electrical sen, ice installation as in claim 18,
further characterized in that each sensing resistor means comprises
a first resistor element having a resistance of approximately 0.0048 ohms,
and
a second resistor element having a resistance of approximately 0.0019 ohms,
and
further characterized by
means for selectively connecting the associated SCR gate across the first resistor element or across both the first and second resistor elements, whereby, when connected across only the first element, the SCR will be triggered at a higher current flow, thereby avoiding nuisance tripping, where a given branch circuit load normally draws current that is within the range of "arc short circuit" currents.

20. An electrical service installation as in claim 17,
wherein
at least one of the branch circuit breakers has a rating of twenty amperes and
further characterized in that
the resistance of the sensing resistor means for each branch circuit breaker with a twenty ampere rating, is approximately 0.0048 ohms,
whereby, the SCR will be triggered when current flow through the associated cable conductor reaches approximately 105 amperes (rms).

21. An acceleration unit to accelerate the magnetic tripping of a circuit breaker, said unit mounted in a circuit breaker box, said unit comprising
an SCR having
an anode,
a cathode, and
a gate,
sensing resistor means,
a gate limit resistor, and housing means on which the SCR, sensing resistor and gate limit resistor are mounted,
a first conductor connected between the output of a circuit breaker and the SCR cathode,
a second conductor connected to a branch circuit conductor,
means connecting the sensing resistor means in series with said first and second conductors and across the SCR cathode and gate, and
a third conductor extending from the SCR anode and connected to an acceleration bypass circuit.

22. An acceleration unit as in claim 21,
wherein the SCR, sensing resistor means and gate limit resistor are embedded in a resinous, flame retardant, potting material to provide the housing means therefor, and further characterized in that the first conductor projects from the housing for direct connection to the output of a circuit breaker.

23. An acceleration unit as in claim 22.
wherein the sensing resistor means comprise
first and second elements, and
the acceleration unit further comprises
means for selectively switching a gate connection to the sensing means so as to place both the first and second elements or only the first element across the SCR gate and cathode.

24. An acceleration unit as in claim 21
wherein the sensing resistor is formed of constantan.

* * * * *